(12) United States Patent
Vogel et al.

(10) Patent No.: US 7,660,178 B2
(45) Date of Patent: Feb. 9, 2010

(54) AREA EFFICIENT FIRST-IN FIRST-OUT CIRCUIT

(75) Inventors: Danny C. Vogel, Sudbury, MA (US); David B. Hildebrand, Coppell, TX (US)

(73) Assignee: LSI Corporation, Milpitas, CA (US)

( * ) Notice: Subject to any disclaimer, the term of this patent is extended or adjusted under 35 U.S.C. 154(b) by 135 days.

(21) Appl. No.: 12/119,548

(22) Filed: May 13, 2008

(65) Prior Publication Data

US 2009/0285045 A1    Nov. 19, 2009

(51) Int. Cl.
*G11C 7/00* (2006.01)
(52) U.S. Cl. .................................... 365/221; 365/227
(58) Field of Classification Search ................. 365/221
See application file for complete search history.

(56) References Cited

U.S. PATENT DOCUMENTS

| | | | | |
|---|---|---|---|---|
| 4,833,651 A | * | 5/1989 | Seltzer et al. | 365/189.07 |
| 4,833,655 A | * | 5/1989 | Wolf et al. | 365/221 |
| 4,912,680 A | * | 3/1990 | Masaki et al. | 365/230.09 |
| 5,274,589 A | * | 12/1993 | Koshizuka | 365/189.011 |
| 6,144,604 A | * | 11/2000 | Haller et al. | 365/221 |

* cited by examiner

*Primary Examiner*—Tan T. Nguyen
(74) *Attorney, Agent, or Firm*—Luedeka, Neely & Graham, P.C.

(57) ABSTRACT

A FIFO memory having an available capacity of no more than N words deep by M bits wide. A write port receives data to store in the FIFO memory, and a read port provides the data stored in the FIFO memory. X memories store the data, where each of the X memories has a size of N/X by M. Control logic receives the data from the write port, writes the data into at least one of the X memories in a serial write manner, reads the data from at least one of the X memories in a serial read manner, and provides the data to the read port. The control logic also disables power to selected ones of the X memories when they are not being written to or read from. The FIFO memory is configured to both read and write the data at a given time to a given one of the X memories.

13 Claims, 1 Drawing Sheet

AREA EFFICIENT FIRST-IN FIRST-OUT CIRCUIT

FIELD

This invention relates to the field of integrated circuit design. More particularly, this invention relates to a memory design for an integrated circuit that reduces the area on the chip required for the memory, and also reduces the power consumption of the memory.

BACKGROUND

A first-in first-out buffer (FIFO) is a specialized memory circuit that is read from with one port and written to with another port. All of the data in the FIFO memory is read out in the exact same order that it was written into the FIFO memory. A FIFO memory reads only sequentially from a random access memory, where the read pointer loops back to the beginning of the RAM when it reaches the end of the RAM. The FIFO memory also writes sequentially to the RAM, where the write pointer similarly loops back to the beginning of the RAM when it reaches the end of the RAM. A FIFO memory is typically able to detect both when it is filled and when it is empty. Further, a typical FIFO memory allows simultaneous read and write operations. FIFO memories can optionally be designed to allow read and write operations from and to different clock domains.

FIFO memory implementation is typically accomplished with what is designated as a 211 memory that is organized as a ring buffer, where the numbers 211 refer to 2 total ports, 1 port configured for reading from the RAM, and 1 port configured for writing to the RAM, respectively. Other FIFO memory designs use 222 memories. FIFO memory is typically implemented using a single block of 211 or 222 memory, where the memory block is always enabled.

Current FIFO memory designs tend to require a relatively large amount of surface area in an integrated circuit, because of the relatively low density of both 211 and 222 memories. A 111 memory (one port, configured to both read and write) has a higher bit density than 211 or 222 memories, meaning that a 111 design can hold a larger memory in a given amount of space within the integrated circuit than either a 211 or a 222 design. A 211 memory generally requires about fifty percent more area than a 111 memory, and a 222 memory requires roughly one hundred percent more area than a 111 memory. However, 211 and 222 memories each have an additional port that a 111 memory does not have, which enables a single block of the 211 and 222 memories to be simultaneously written to and read from, where a 111 cannot receive such simultaneous access. Thus, 111 memory has not been used for FIFO memory designs.

In addition, FIFO memory designs tend to require a relatively large amount of power, due to the power requirements of the different memory blocks used within the FIFO memory.

What is needed, therefore, is a system that overcomes problems such as those described above, at least in part.

SUMMARY

The above and other needs are met by a FIFO memory having an available capacity of no more than N words deep by M bits wide. A write port receives data to store in the FIFO memory, and a read port provides the data stored in the FIFO memory. X memories store the data, where each of the X memories has a size of N/X by M. Control logic receives the data from the write port, writes the data into at least one of the X memories in a serial write manner, reads the data from at least one of the X memories in a serial read manner, and provides the data to the read port. The control logic also disables power to selected ones of the X memories when they are not being written to or read from. The FIFO memory is configured to both read and write the data at a given time to a given one of the X memories.

In various embodiments of the invention, the X memories are individually configured as one of 211 and 222 memories. The X memories are all configured as one of 211 and 222 memories. Integrated circuits including various embodiments of the FIFO memories are also described herein.

According to another aspect of the invention there is described a FIFO memory having an available capacity of no more than N words deep by M bits wide. A write port receives data to store in the FIFO memory, and a read port provides the data stored in the FIFO memory. X memories store the data, where each of the X memories has a size of N/(X−1) by M. Control logic receives the data from the write port, writes the data into at least one of the X memories in a serial write manner, reads the data from at least one of the X memories in a serial read manner, and provides the data to the read port. The FIFO memory is configured to only one of read and write the data at a given time to a given one of the X memories.

According to yet another aspect of the invention there is described a FIFO memory having an available capacity of no more than N words deep by M bits wide. A write port receives data to store in the FIFO memory, and a read port provides the data stored in the FIFO memory. X memories store the data, where each of the X memories has a size of N/(X−1) by M. One additional memory has a size of N/(X−1) by M. Control logic receives the data from the write port, writes the data into at least one of the X memories in a serial write manner, reads the data from at least one of the X memories in a serial read manner, and provides the data to the read port. The FIFO memory is configured to only one of read and write the data at a given time to a given one of the X memories, simultaneously write the data to a given one of the X memories and the one additional memory, and selectively read the data from only one of either the X memories or the one additional memory at a given time.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
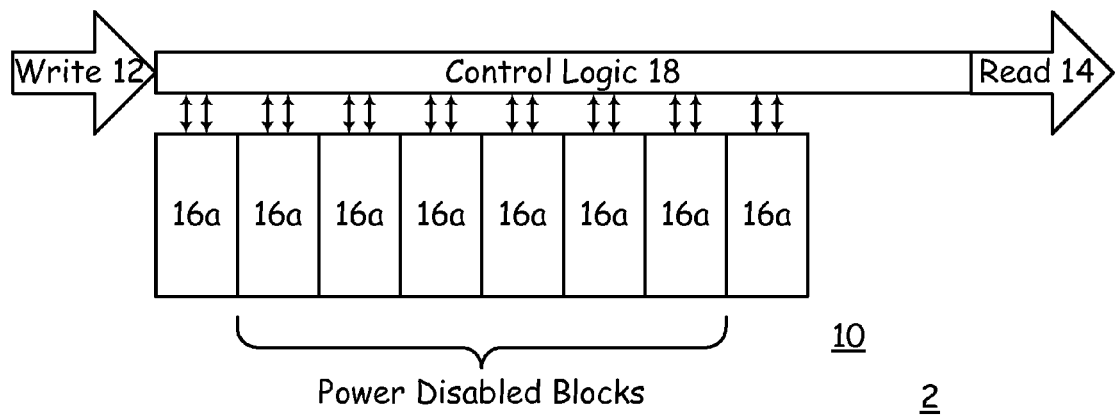
FIG. 1 is a functional block diagram of a first-in first out memory within an integrated circuit according to an embodiment of the present invention.

According to one embodiment of the invention as depicted in FIG. 1, the FIFO memory 10 receives the data through the write port 12, and the data is stored under the control of a control logic 18. Data is written out of the FIFO memory 10 through a read port 14, again under the control of the control logic 18. The FIFO memory 10 is broken down into multiple memory blocks 16a of either a 211 design or a 222 design within a larger integrated circuit 2. Each memory block 16a has a size of N/8 by M, where the entire FIFO memory 10 is N words deep by M bits wide. The "8" in the denominator in the designation of the depth of each block 16a comes from the eight different blocks 16a that are used in the particular design as depicted, which is by way of example only. In actual implementation, the design could have parsed the FIFO memory 10 into nine blocks 16a. In some embodiments, some of the blocks 16a have different sizes.

The memory blocks 16a that are not currently being used are disabled, or in other words power is not applied to them, thus saving some amount of dynamic power in those blocks 16a that are disabled. FIG. 1 indicates that the first and last blocks 16a in the FIFO memory 10 are currently enabled, but this is merely representative, and at different times, different blocks 16a would be enabled. Thus, the embodiment of FIG. 1 provides power savings to a standard FIFO memory design.

Figure 2:
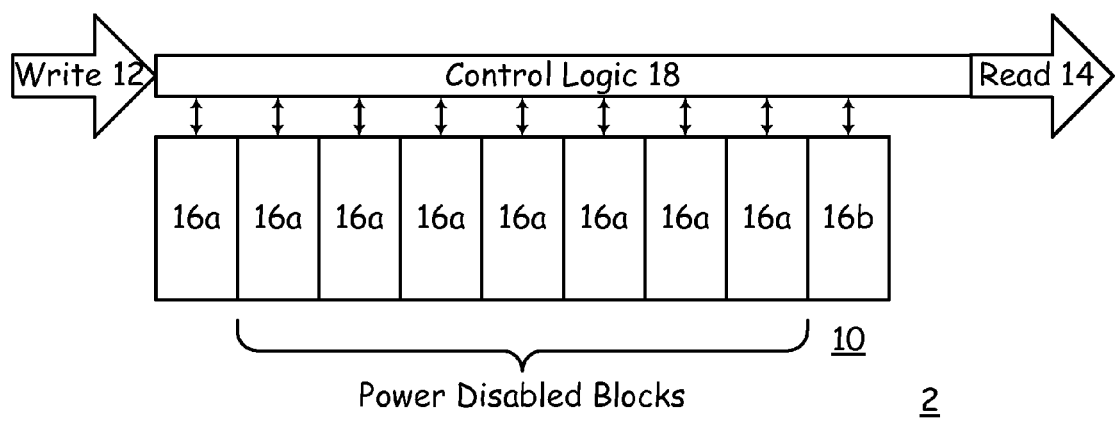
FIG. 2 is a functional block diagram of a first-in first out memory within an integrated circuit according to another embodiment of the present invention.

As depicted in the embodiment of FIG. 2, adding one extra block 16b allows the FIFO memory 10 to be implemented such that the write port 12 and the read port 14 never access the same block of memory 16 at the same time. This allows the use of a much denser 111 memory to implement the FIFO memory 10, saving a substantial amount of die area in addition to the power savings from managing the memory enable.

More specifically, according to various embodiments of the present invention, a larger FIFO memory design is broken down into multiple 111 memory blocks 16a and 16b. One extra block 16b beyond the total desired memory size is then added to the design. For example, if 2,096 words are desired in the design (2K), this could be configured as nine blocks 16 of 256 words, where the ninth block 16b is the extra block that is added on top of the eight 256 word blocks 16a that are required for 2K words of memory. Adding this one extra block 16b allows the FIFO memory 10 to be implemented such that the one write port 12 and the one read port 14 only access the same block of memory 16 at the same time when the FIFO memory 10 is nearly empty, where "nearly empty" means that there is no more than one block 16 of data in the FIFO memory 10.

Because there is one "extra" memory block 16b above the available capacity of the FIFO memory 10, a simultaneous read and write operation is never needed on a single block of memory 16, and the denser 111 memories 16 can be used in the embodiment depicted in FIG. 2. Thus, although the embodiment of FIG. 2 has one extra memory block 16b than the embodiment of FIG. 1, because the embodiment of FIG. 1 is implemented with 211 or 222 memory 16, and the embodiment of FIG. 2 is implemented with 111 memory 16, the FIFO memory 10 of FIG. 2 might take less space within the integrated circuit than the FIFO memory 10 of FIG. 1. Thus, the embodiment of FIG. 2 provides both power savings and smaller size to a standard FIFO memory design.

Figure 3:
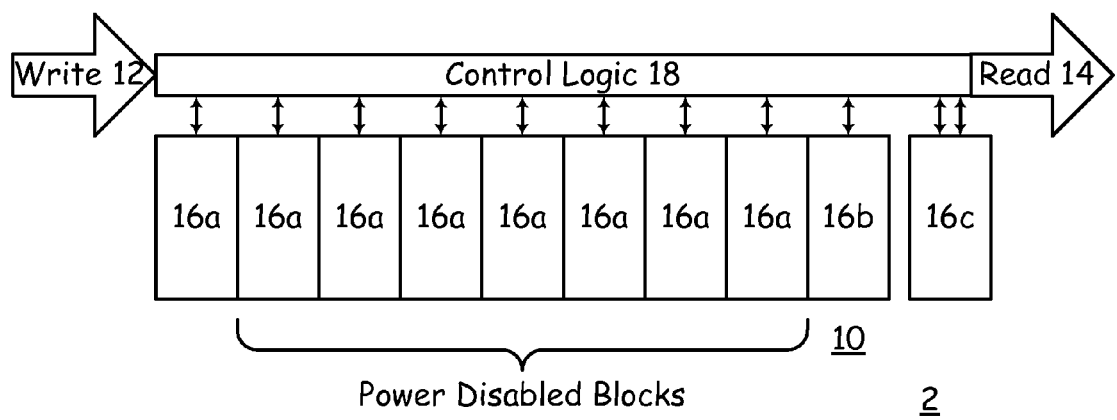
FIG. 3 is a functional block diagram of a first-in first out memory within an integrated circuit according to yet another embodiment of the present invention.

With reference now to FIG. 3, there is depicted another embodiment, where the eight blocks 16a required for the desired memory size (or whatever number of blocks 16a are actually required for the desired memory size) are all implemented using a 111 memory design. An additional block of memory 16b is also implemented as a 111 memory design, and having the same size as the other blocks 16a. Yet another additional block of memory 16c is implemented as either a 222 or a 211 memory design, having the same size as the other blocks 16a, and is used for the "most recently written" (MRW) block 16c, and is implemented as a ring buffer. In one embodiment, the control logic 18 and all of the memories 16 in the FIFO memory 10 operate at the same frequency as the fastest clock domain that is accessed by either the write port 12 or the read port 14.

In this embodiment, all writes go to both the appropriate 111 memory block 16a or 16b and to the MRW block 16c. The FIFO memory 10 is full when it contains N words of data, even though the FIFO memory 10 has N+N/8 words of storage (to continue the example above). Reads always come from the 111 memory block 16a or 16b, unless both the read pointer and the write pointer are pointing to the same block 16a or 16b, in which case the read then comes from the MRW memory 16c.

The control logic 18 can be simplified by using powers of two for the size of the FIFO memory 10. For example, the FIFO memory 10 can be constructed as B blocks 16 of N words each, where $N=2^k$. The empty condition is defined as when the position of the read pointer is the same as the position of the write pointer. The full condition is defined as when (the position of the write pointer+(N−1))(mod BN) is the same as the position of the read pointer, when an extra block of memory 16b isn't used. When an extra bock of memory 16b is used, then the full condition is defined as when (the position of the write pointer+N)(mod BN) is the same as the position of the read pointer. A near empty condition is defined as when the position of the write pointer AND!$(2^k-1)$ is the same as the position of the read pointer AND!$(2^k-1)$. In a near empty condition, the data is read from the MRW 16c, instead of from the memories 16a or 16b.

The embodiments of the present invention operate much like a standard FIFO memory, in that they read sequentially from the RAM 16a and 16b (at most times and in most embodiments), they loop at the logical end of the memories 16a and 16b, they write sequentially to the RAM 16a and 16b, similarly looping at the logical end of the memories 16a and 16b. The FIFO memories 10 of the present invention detect full and empty states, and some embodiments detect near empty states. The FIFO memories 10 allow simultaneous read and write operations to different RAM locations, using 111 memory designs. The FIFO memories 10 also allow read and write operations from different clock domains.

By implementing these FIFO memory 10 designs according to the present invention, less space within the integrated circuit is used for larger FIFO memories 10, because they use the more dense 111 memory for most of the FIFO memory 10, even though an extra block of both 111 memory 16b and 222 or 211 memory 16c is used in some embodiments. The amount of power required per bit of memory in the FIFO memory 10 may be lessened, because the 111 blocks 16a and 16b that are not currently in use can be disabled to conserve power.

In various embodiments, a decoupling FIFO memory (DFIFO) with a true 222 or 211 memory configuration can be added to a slower clock domain that is accessing the FIFO memory 10. The DFIFO is preferably two words deep. If used on the read end, the control logic 18 preferably fills the DFIFO. If used on write end, the control logic 18 preferably empties the DFIFO quickly, meaning without a clock delay. If there is only one clock domain accessing the FIFO memory 10, then preferably no DFIFO is needed.

To reduce the amount of power that is consumed by the FIFO memory 10, the control logic 18 can disable the power to any 111 block 16a or 16b that is not being used, as described above. This does not impact the performance of a FIFO memory 10 implementation where the next access location is known. The 111 blocks 16a and 16b of some embodiments may be implemented in such a way as to share some blocks, such as BIST controllers, in order to save even more area and power. The FIFO memory 10 is implemented in some embodiments with different numbers of physical memory blocks 16. As mentioned above, even though the number of eight blocks 16a was given in the examples above, four, ten, sixteen, or some other number of blocks may be used. Different embodiments can allow pseudo random read operations, where either the read operation may never be to the same block as the writer, or the read can tolerate a delay or wait while the writer completes.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A FIFO memory having an available capacity of no more than N words deep by M bits wide, comprising:
    a write port for receiving data to store in the FIFO memory,
    a read port for providing the data stored in the FIFO memory,
    X memories to store the data, where each of the X memories has a size of N/X by M, and
    control logic for receiving the data from the write port, writing the data into at least one of the X memories in a serial write manner, reading the data from at least one of the X memories in a serial read manner, and providing the data to the read port, the control logic also for disabling power to selected ones of the X memories when they are not being written to or read from,
    where the FIFO memory is configured to both read and write the data at a given time to a given one of the X memories.

2. The FIFO memory of claim 1, wherein the X memories are individually configured as one of 211 and 222 memories.

3. The FIFO memory of claim 1, wherein the X memories are all configured as one of 211 and 222 memories.

4. An integrated circuit including the FIFO memory of claim 1.

5. A FIFO memory having an available capacity of no more than N words deep by M bits wide, comprising:
    a write port for receiving data to store in the FIFO memory,
    a read port for providing the data stored in the FIFO memory,
    X memories to store the data, where each of the X memories has a size of $N/(X-1)$ by M, and
    control logic for receiving the data from the write port, writing the data into at least one of the X memories in a serial write manner, reading the data from at least one of the X memories in a serial read manner, and providing the data to the read port,
    where the FIFO memory is configured to only one of read and write the data at a given time to a given one of the X memories.

6. The FIFO memory of claim 5, wherein the X memories are all configured as 111 memories.

7. The FIFO memory of claim 5, wherein the control logic is also for disabling power to selected ones of the X memories when they are not being written to or read from.

8. An integrated circuit including the FIFO memory of claim 5.

9. A FIFO memory having an available capacity of no more than N words deep by M bits wide, comprising:
    a write port for receiving data to store in the FIFO memory,
    a read port for providing the data stored in the FIFO memory,
    X memories to store the data, where each of the X memories has a size of $N/(X-1)$ by M,
    one additional memory having a size of $N/(X-1)$ by M, and
    control logic for receiving the data from the write port, writing the data into at least one of the X memories in a serial write manner, reading the data from at least one of the X memories in a serial read manner, and providing the data to the read port,
    where the FIFO memory is configured to only one of read and write the data at a given time to a given one of the X memories, simultaneously write the data to a given one of the X memories and the one additional memory, and selectively read the data from only one of either the X memories or the one additional memory at a given time.

10. The FIFO memory of claim 9, wherein the X memories are all configured as 111 memories.

11. The FIFO memory of claim 9, wherein the one additional memory is configured as a 222 memory.

12. The FIFO memory of claim 9, wherein the control logic is also for disabling power to selected ones of the X memories when they are not being written to or read from.

13. An integrated circuit including the FIFO memory of claim 9.

* * * * *